(12) United States Patent
Adams et al.

(10) Patent No.: US 11,278,913 B1
(45) Date of Patent: Mar. 22, 2022

(54) SYSTEMS FOR SEPARATING COPPER FROM SHREDDER RESIDUE

(71) Applicant: SA Recycling LLC, Orange, CA (US)

(72) Inventors: Mike Adams, Anaheim Hills, CA (US); George Adams, Orange, CA (US); Clifford Glen Newby, Orange, CA (US); Alex Meza, Chino, CA (US)

(73) Assignee: SA Recycling LLC, Orange, CA (US)

( * ) Notice: Subject to any disclaimer, the term of this patent is extended or adjusted under 35 U.S.C. 154(b) by 0 days.

(21) Appl. No.: 17/374,495

(22) Filed: Jul. 13, 2021

(51) Int. Cl.
*B03B 9/06* (2006.01)
*B03B 5/48* (2006.01)

(52) U.S. Cl.
CPC . *B03B 5/48* (2013.01); *B03B 9/06* (2013.01)

(58) Field of Classification Search
CPC .................................. B03B 5/48; B03B 9/06
USPC ....................................................... 209/157
See application file for complete search history.

(56) References Cited

U.S. PATENT DOCUMENTS

| | | | | |
|---|---|---|---|---|
| 2,153,046 A * | 4/1939 | Lang | ........................ | D06B 1/02 68/205 R |
| 3,817,458 A * | 6/1974 | Gilberto | .................... | B03B 9/06 241/20 |
| 5,080,291 A | 1/1992 | Bloom | | |
| 5,485,925 A * | 1/1996 | Miller | ................... | B07B 13/003 209/615 |
| 6,903,294 B1 * | 6/2005 | Daiku | ...................... | B03C 7/10 209/127.3 |
| 8,636,148 B2 * | 1/2014 | Harding | ................... | B07C 5/344 209/11 |
| 2003/0141225 A1 * | 7/2003 | Liddle | ...................... | B03B 9/06 209/18 |
| 2007/0187299 A1 * | 8/2007 | Valerio | ................... | B03B 13/00 209/12.1 |

(Continued)

FOREIGN PATENT DOCUMENTS

CN 203061283 U * 7/2013
CN 205074071 U * 3/2016
(Continued)

OTHER PUBLICATIONS

Metal Marketing, "Conveyors." Accessed Apr. 2, 2020. https://www.metal-marketing.hr/en/products/conveyors.
(Continued)

*Primary Examiner* — Terrell H Matthews
(74) *Attorney, Agent, or Firm* — SoCal IP Law Group LLP; Guy Cumberbatch

(57) ABSTRACT

Systems and methods for separating materials and recovery of valuable copper from shredded end-of-life vehicles and appliances are disclosed. Shredded matter, or ASR, is sent through a series of sorters before reaching a system that separates out copper bits. The system utilizes a pair of conveyor belts; one for de-watering and removing most of the plastic and glass particles and a second below the first for separating the copper bits. The second conveyor belt has a belt with a particular tooth pattern and material softness, and is set at a slight uphill incline angle. Water is delivered from the top down the slope and the belt successfully transports mostly just copper up and over a top edge to a collection bin. A cascading series of pairs of conveyors may be used to ensure nearly complete recovery of the copper.

18 Claims, 9 Drawing Sheets

(56) References Cited

U.S. PATENT DOCUMENTS

| | | | | |
|---|---|---|---|---|
| 2008/0128333 A1* | 6/2008 | Smith | ................... | B03B 11/00 |
| | | | | 209/241 |
| 2008/0257794 A1 | 10/2008 | Valerio | | |
| 2009/0126238 A1* | 5/2009 | Platt | ...................... | E02F 3/082 |
| | | | | 37/338 |
| 2011/0186660 A1* | 8/2011 | Harding | ................... | B03B 1/02 |
| | | | | 241/24.1 |
| 2019/0211419 A1 | 7/2019 | Conway | | |

FOREIGN PATENT DOCUMENTS

| | | | | | |
|---|---|---|---|---|---|
| CN | 108576844 A | * | 9/2018 | .............. | A23N 5/00 |
| KR | 101227633 B1 | * | 1/2013 | | |

OTHER PUBLICATIONS

Metal Marketing, "MM s2000-300." Accessed Apr. 2, 2020. https://www.metal-marketing.hr/en/products/wet-separators/item/97-mm-s2000-300.

* cited by examiner

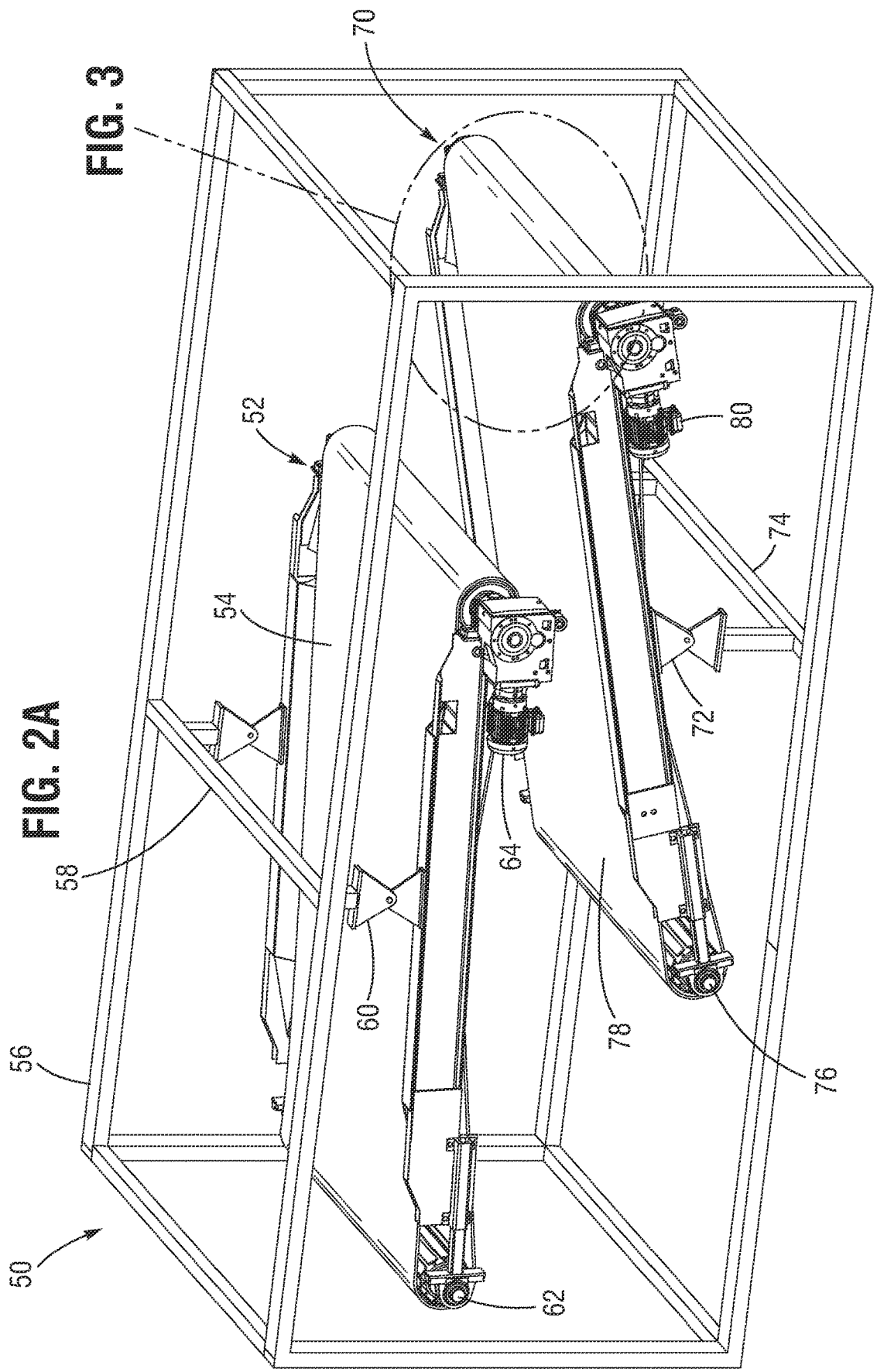

SYSTEMS FOR SEPARATING COPPER FROM SHREDDER RESIDUE

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to material separation, such as recovery of metals from end-of-life vehicles.

Description of the Related Art

Approximately 12-15 million vehicles reach the end of their use each year in just the United States alone. For economic and ecological reasons, recovery of the metal and other materials contained in the scrap vehicles is becoming more important. About 65% of a typical car is made from steel, and the rest is made of other metals plus glass, rubber, foam and fiber.

The process of vehicle recycling typically first includes the pretreatment or de-pollution (e.g., removal of tires, battery, lubricants and fuel), shredding the vehicle using an industrial shredder (essentially a large hammer mill), and then sorting the shredded pieces to recover valuable material.

In the automobile recycling industry, when an industrial shredder processes an automobile, the output material is commonly known as automobile shredder residue, or ASR. For convenience, the output material from an industrial shredder will be called ASR, even if it is derived from articles other than automobiles.

Sorting is typically accomplished with a series of devices—first through gross sorters and then magnetic separators to extract ferrous metal pieces, for example, and then separators to extract non-ferrous metal pieces. The removal of non-magnetic metals such as aluminum and copper, as well as non-magnetic stainless steel, may be achieved using an eddy current separator in which a current is induced in the metal pieces by a rapidly rotating rotor having magnets with alternating polarity. The rotating magnetic fields create alternating currents within the metal pieces which create electromagnetic fields of their own. These opposing magnetic fields repel each other, causing the non-ferrous metal pieces to jump off the rotating conveyor belt into adjacent collection bins.

The rates at which the material separators work can limit productivity and thus profitability. Recovering valuable copper wire, in particular, is a difficult task. Other than Eddy separators, one conventional technique for recovering copper wire from the remaining shred includes first using an air table which creates an up flow of air so that glass and other light particles float on top, making that material easier to separate. The resulting denser materials are then ball milled and passed through a series of filters to separate the fine particles (e.g., small plastic, sand) from the larger metallic particles, typically copper. Another method that is used is wet shaker tables, which involve a vibrating table having a rough surface which is inclined at a slight angle. By passing water downward along the table and vibrating the table at the same time in a rotary fashion, copper wire can be urged upward over the top edge of the table while lighter materials are washed downward.

Conventional processes recover perhaps 10-20% of the copper wire in the shredded flow. Increasing the yield of copper recovery can be quite valuable.

DESCRIPTION OF THE DRAWINGS

FIG. 2A and FIG. 2B are perspective and elevational views of a simple system for recovering copper from shredded waste, with FIG. 2B illustrating exemplary belt incline angles.

Figure 1:
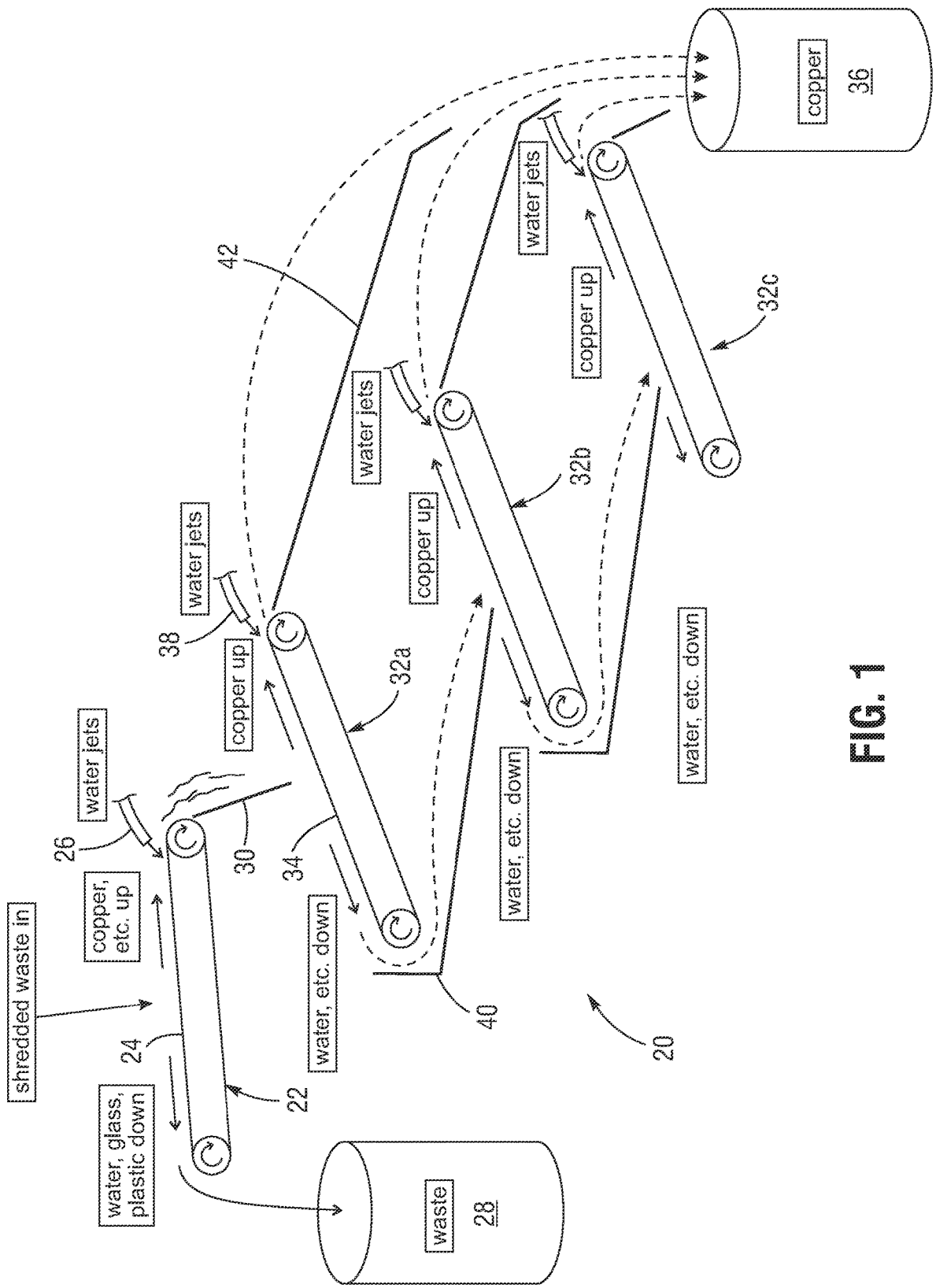
FIG. 1 is a schematic diagram of one embodiment of a multi-stage roller system for recovery of copper from shredded waste, or ASR.

Throughout this disclosure, elements appearing in figures are assigned reference designators. An element that is not described in conjunction with a figure may be presumed to have the same characteristics and function as a previously-described element having the same reference designator.

DETAILED DESCRIPTION

Systems and methods for separation of materials are disclosed, and especially for recovery of copper from end-of-life vehicles and appliances. In vehicle recycling systems, the following are certain desirable attributes, in no particular order: high speed of processing; high quality of separation—each type of metal, and non-metals; low environmental impact; low need for manual labor.

A technique to recover copper scrap from shredded waste, such as from vehicles and appliances is disclosed. Tests of the technique prove that up to 80-90% of the copper wire in the shredded flow can be recovered, representing a four-fold increase from previous methods. In terms of large scrap recovery operations, this increased yield can result in increased revenues of millions of dollars per year.

Systems and methods for separating materials and recovery of valuable copper from shredded ASR derived from end-of-life vehicles and appliances are disclosed. ASR comprises a mixture of individual, solid pieces of varying shape, size, mass, specific gravity, composition, density and color. Variations are amongst ASR pieces and may be within ASR pieces. ASR pieces have variations in external shape, which is often irregular but may be regular, and varying surface area. The size of ASR pieces varies considerably, typically from approximately five inches in diameter or more to microscopic. Likewise, some pieces are compact having relatively uniform dimensions in all directions, while others are elongated or planar. An individual ASR piece may be comprised of one or more of ferrous metal, non-ferrous metal (e.g., copper, aluminum), metal alloys, glass, fiber, rubber, liquids, plastics and dirt. The character of ASR pieces in any one load from a shredder depends greatly on the type of vehicle or other material being shredded. ASR pieces vary in color.

The sizes and shapes of the various ASR pieces influence the process of separating heavier from lighter pieces. That is, any one load of ASR pieces has certain characteristics that may differ from other loads. For instance, some loads are predominately lighter pieces, or larger sizes, or conversely may include a greater proportion of large ferrous metal pieces. The character of the ASR pieces affects the rate and efficiency of separation, which in turn may be accommodated by adjusting the fluid flow rates, conveyor incline angles, belt speeds, etc. Knowledge of the ASR character can thus be translated into optimum separator parameters so that the throughput is maximized. As used herein, the terms "heavier" and "lighter" refer to relatively greater and lesser specific gravity, respectively. Within the system, absolute weight is less important than buoyancy and friction.

Shredded matter, or ASR, is sent through a series of sorters before reaching a system that separates out copper bits. The system utilizes a pair of conveyor belts; one for de-watering and removing most of the plastic and glass particles and a second below the first for separating the copper bits. The second conveyor belt has a belt with a particular tooth pattern and material softness, and is set at a slight uphill incline angle. Water is delivered from the top down the slope and the belt successfully transports mostly just copper up and over a top edge to a collection bin. A cascading series of pairs of conveyors may be used to ensure nearly complete recovery of the copper.

Referring now to FIG. 1, there is shown a schematic diagram of a multi-stage sluice belt conveyor system 20 for recovery of copper from shredded waste, or ASR. The system 20 includes a macro separator 22 having a belt 24 onto which ASR is first deposited. The macro separator 22 is oriented at a slight horizontal angle with the rollers causing the belt 24 to convey upward at a first angle of inclination. One or more water jets 26 are directed to an upper portion of the belt 24 such that the water passes downward over the inclined belt and eventually into a waste container 28. The effect of the downwardly flowing water along the upwardly moving belt 24 carries primarily lighter material such as water, glass and plastic downward to be deposited into the waste container 28. At the same time, heavier material such as copper is transported upward with the moving belt 24 until it spills over the upper end and drops down a chute 30.

The macro separator 22 eliminates most of the lighter material from the overall ASR. The angle of the belt 24 is slight enough, typically 0-4°, such as between 2.5°-3.0° from the horizontal, such that the heavier material is not inordinately affected by the flowing water and mostly transported over the top edge of the separator 22. A relatively large amount of water flow through the jets 26 may be used to better carry away the lighter material. The physical characteristics of the belt 24 may vary, from simple flat belts to ones with ribs, cleats, or the like. Indeed, rather than a conveyor belt, the macro separator 22 may be a shaker table, or other type of light/heavy material separator known in the art. The macro separator 22 is utilized mainly to remove non-copper components of the ASR.

From the macro separator 22, the material that carries over the upper end of the belt 24 falls down the chute 30 onto a midpoint of a first copper recovery conveyor 32a having a belt 34. In the illustrated embodiment, the multistage sluice belt conveyor system 20 incorporates multiple copper recovery conveyors in series leading to a copper recovery bin 36. In particular, the system 20 has three copper recovery conveyors 32a, 32b, 32c arranged in a downwardly cascading series leading to the copper recovery bin 36. Each of the copper recovery conveyors 32a, 32b, 32c may be identical, and identically oriented and operated, or the conveyors may incorporate differences designed to optimize the copper recovery. For the purpose of brevity, each of the copper recovery conveyors 32a, 32b, 32c will be deemed to be identical such that a description of one applies to the others. Moreover, although three copper recovery conveyors 32a, 32b, 32c are shown, just two, or more than three may also be utilized.

Each of the copper recovery conveyors 32a, 32b, 32c includes the belt 34 which moves upward along the angle of incline. The belt 34 is desirably angled between 0°-15. Water jets 38 supply a constant flow of water downward along the belt 34 which acts to carry remaining lighter material downward to a lower chute 40. For instance, a water flow of 150 gpm (gallons per minute) may be utilized. Conversely, the belt 34 is designed to catch copper scrap such as wire and carry it upwards over the top end of the belt 34 to an upper chute 42. The copper which drops into the upper chute 42 eventually falls into the copper recovery bin 36. A brush (not shown) may be situated at the point at which the belt 34 turns 180° under the conveyor to help knock off the copper strands.

Each of the lower chute 40 transports the lighter waste and whatever copper remains to a mid-point of the next copper recovery conveyor 32 downward in the series. The process continues until the copper content of the waste being sluiced downward along each conveyor is minimized, or reaches a desired level.

To obtain a desired particular character of shredded waste and desired copper yield, the copper recovery conveyors may be adjusted, such as angle of incline, speed of the belt and waterflow. An increase of angle of incline results in more lighter pieces tumbling downward and thus the water flow may be reduced and/or the belt speed increased. Conversely, a decrease in angle of incline may necessitate greater water flow and/or decrease in belt speed. An increase in belt speed likewise may require less water and/or a more shallow inclination angle, while a decrease in belt speed results in the opposite. An increase in water flow could be coupled with a more shallow inclination angle and higher belt speed, and a decrease in water flow may justify raising the inclination angle and/or lowering the belt speed.

Other parameters that may be adjusted include temperature of the belts, temperature of the ASR, air flow, air temperature, water turbulence, air turbulence, conveyor motion (e.g., swaying up and down or side to side), application of electric and/or magnetic fields, surface quality of the belts (static and/or dynamic). These parameters may be under automated control to adapt the system to the specific quality of ASR being processed. For example, optical and other sensors may be used to assess the ASR and, in combination with atmospheric conditions, market conditions (e.g., value of different materials and difficulty and cost of processing and shipping), the system can be dynamically adjusted to yield desired output. Parametric adjustment may follow a hysteresis loop. Input, output and control parameters may be absolute, relative and/or ranged.

One example for ASR which results in a good copper yield is between 10-15° incline angle of the copper recovery conveyor 32 with a water flow through the jets 38 of between about 50-500 gpm, and a belt speed of between about 50-100 feet/minute. These parameters may be adjusted based on the character of the incoming ASR, and the different conveyors 32a, 32b, 32c in series may be operated with the same or different parameters.

Figure 2B:
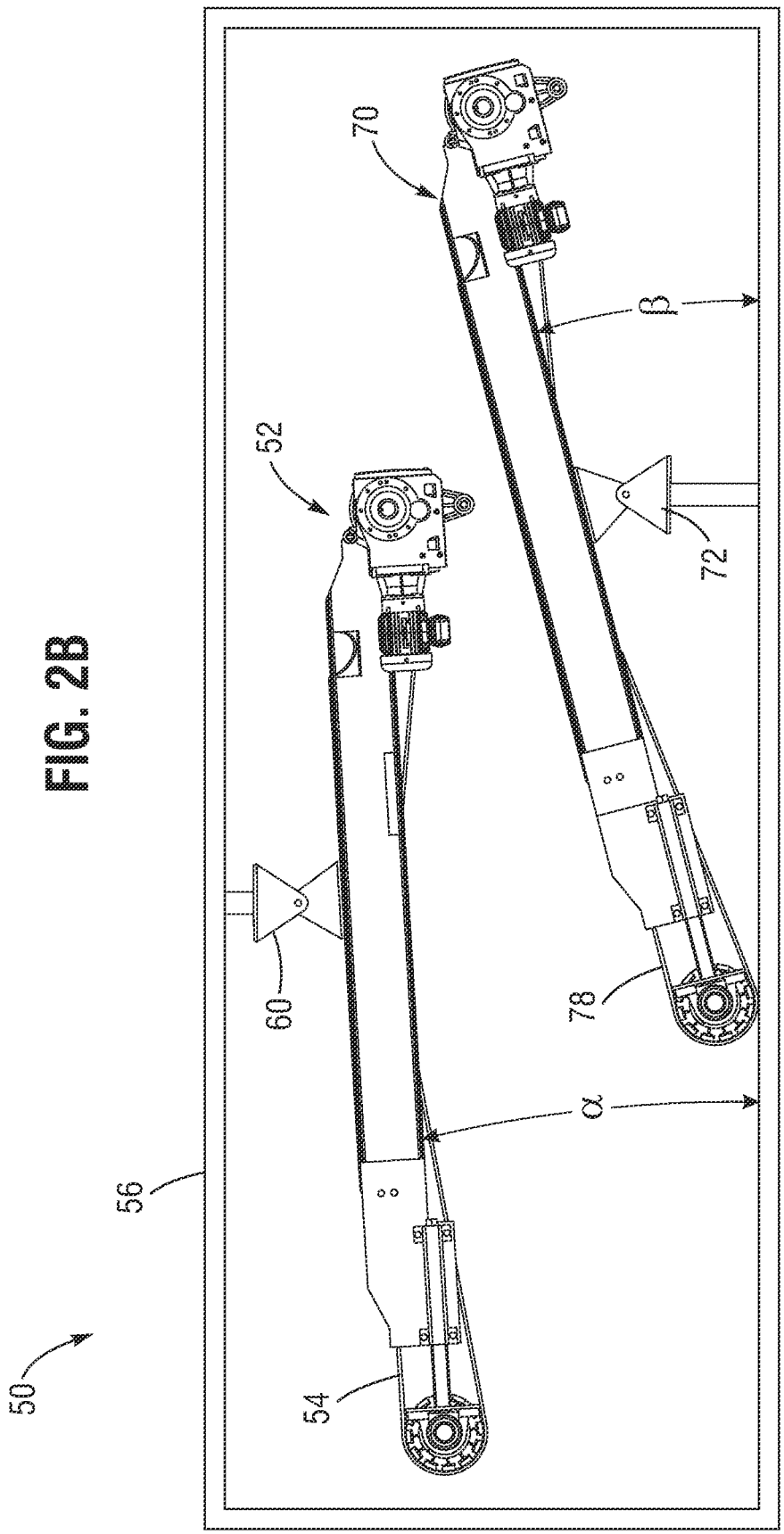

FIG. 2A and FIG. 2B are perspective and elevational views of a simple system 50, or modular unit, for recovering copper from ASR, with FIG. 2B illustrating exemplary belt incline angles. The simple system 50 includes a macro separator 52 having a belt 54 which is used primarily for removing lighter components of the ASR. The macro separator 52 is mounted within an outer framework 56, specifically hanging from an upper bracket 58 on a pair of adjustable hinges 60. As seen in FIG. 2B, the incline angle of the upper surface of the belt 54 is indicated as α. The belt 54 rotates on a pair of rollers 62, an upper one of which is driven by a motor 64.

The outer framework 56 also supports a copper recovery conveyor 70 approximately centered underneath the upper end of the macro separator 52. The copper recovery conveyor 70 may be supported on a pair of adjustable hinges 72 fixed to a lower bracket 74. The copper recovery conveyor 70 also has a pair of end rollers 76 around which a belt 78 rotates. A motor 80 drives the upper end roller 76. As seen in FIG. 2B, the incline angle of the upper surface of the belt 78 is indicated as β, such as between about 0-15°. This simple system 50 including the macro separator 52 and copper recovery conveyor 70 mounted in framework 56 provides a convenient rectangular modular unit for a larger copper separation system, as will be described below. In one embodiment, the length of the modular unit defined by the outer framework 56 is about 12 feet, with the height and depth proportional thereto, such as between 4-5 feet each. The dimensions of one of the modules can be adjusted up or down depending on the capacity desired and the space available.

Figure 3:
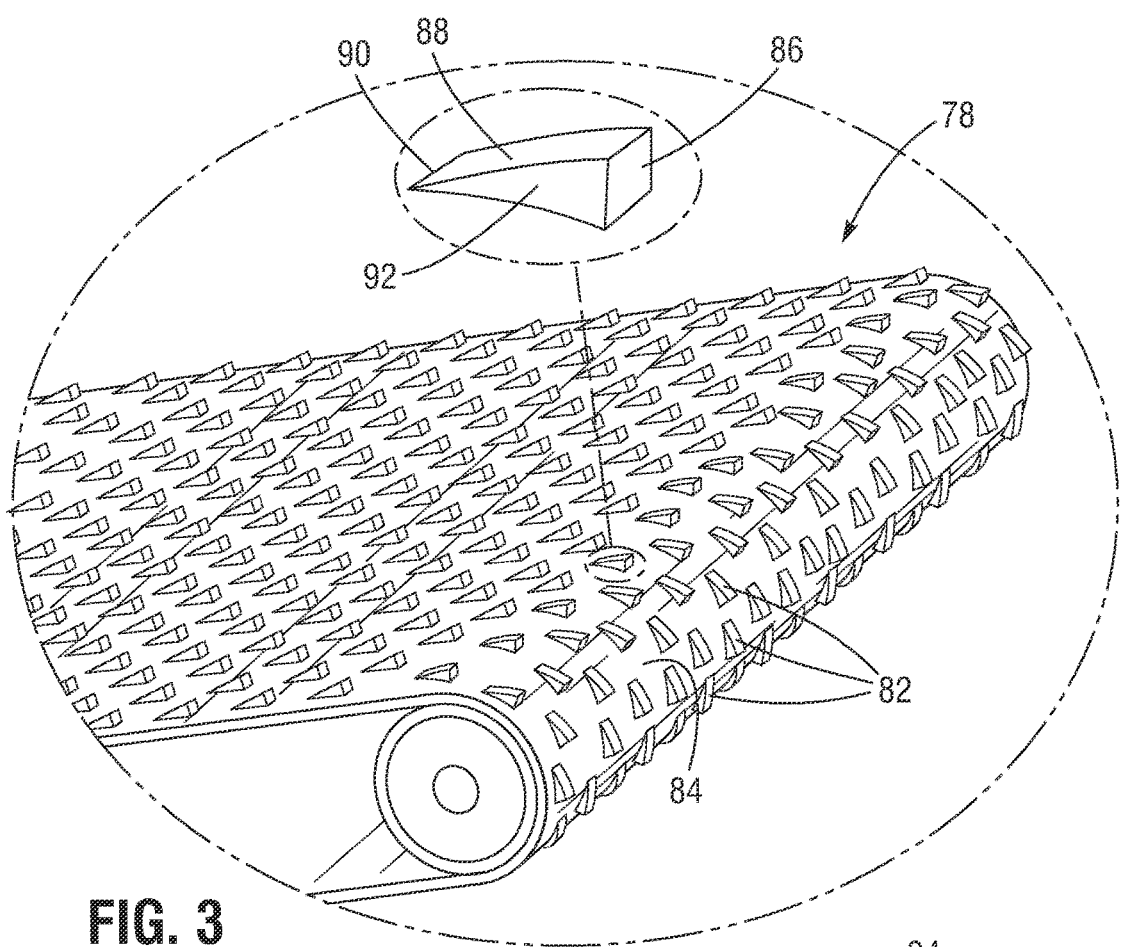
FIG. 3 is an enlargement of a portion of a copper recovery conveyor belt used in the system.
Figure 3A:
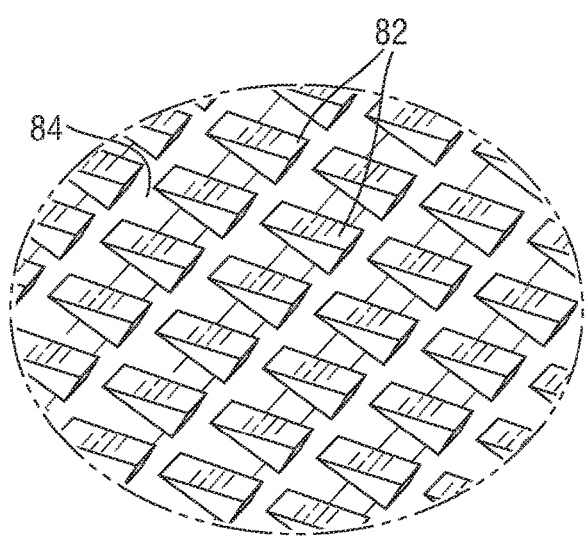
FIG. 3A and FIG. 3B are perspective and plan views of the belt.
Figure 3B:
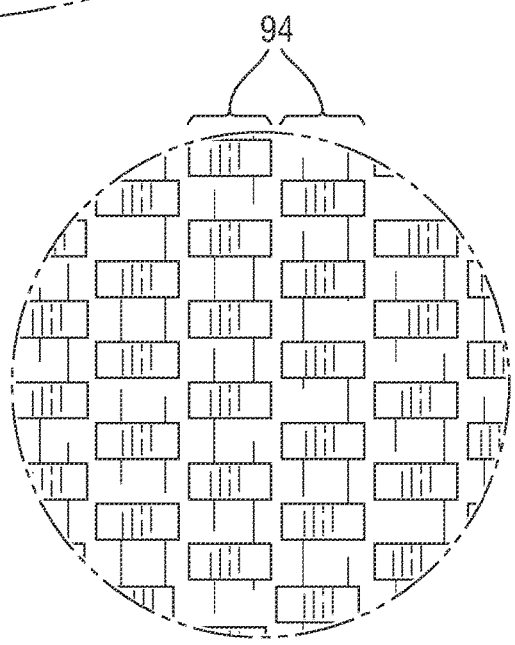

FIG. 3 is an enlargement of a portion of a copper recovery conveyor belt 78 used in the system, and FIGS. 3A and 3B are perspective and plan views of the belt. Various belts have been utilized, and the particular belt 78 shown should not be considered limiting. However, in general, for greater copper recovery the belt 78 should be formed of an elastomeric material with a particular durometer and have multiple cleats 82 projecting upward from a planar base 84.

As seen in the enlargement in FIG. 3, each cleat 82 comprises a sawtooth or wedge-shaped projection having a tall leading end 86 that tapers down along an upper surface 88 to a trailing end 90 at the level of the planar base 84. The sidewalls 92 are thus generally triangular. In one embodiment, the cleats 82 have a height at the leading end 86 of about 0.25 inch, though other sizes are contemplated. The belt 78 may be reinforced with embedded fibers extending longitudinally throughout for durability. As best seen in FIG. 3B, the cleats 82 are distributed evenly in rows 94 extending laterally across the base 84, with the cleats in one row being laterally offset from the cleats in the adjacent rows. One exemplary belt 78 that has proven effective is made of 2-ply Polyvinyl Chloride (PVC) with a durometer of 50 as measured on the A-scale, with cleats 82 that are 0.25 inches tall, 0.25 inches wide and 0.375 inches long (from leading to trailing ends).

Figure 4:
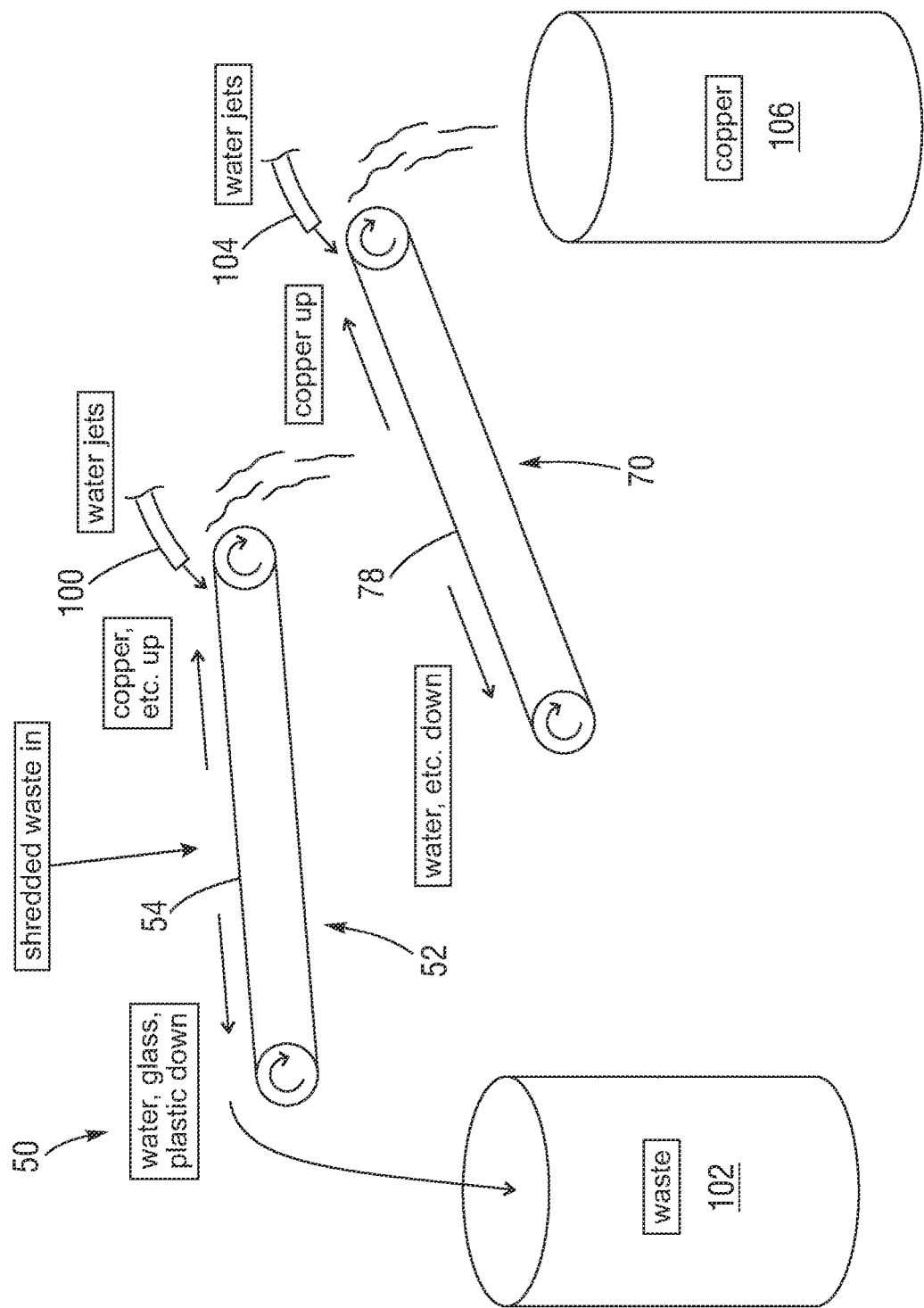
FIG. 4 is a schematic flow diagram of the simple system of FIG. 2A in use.

FIG. 4 is a schematic flow diagram of the simple system 50 of FIG. 2A in use. Shredded waste from automobiles or appliances is dropped at a midpoint of belt 54 of the macro separator 52. Water from jets 100 is directed to an upper portion of the belt 54 which is slightly angled, as explained above. The water runs down the belt 54, which at the same time is translating upward, and the water carries with it a majority of the lighter material, such as fines, glass, plastic, and the like. This waste material is then deposited in a waste receptacle 102. The belt 54 catches most of the copper and other heavy material that is not washed away by the water, and transports it over the top end of the separator 52. The top end is positioned over a midpoint of the copper recovery conveyor 70, and the dropping material may be guided by a chute (not shown).

The heavy material that has been dropped at the midpoint of the copper recovery conveyor 70 is then acted on by a sheet of water from jets 104. Because of the incline of the conveyor 70, the water travels down along the conveyor belt 78 and carries with it a majority of the lighter material that remains in the waste stream. The cleats 82 (FIG. 3) on the belt 78 catch a majority of the copper scrap such as small bits of wire and the like from the waste stream and transport it over the top end of the conveyor 70, where it drops into a copper recovery bin 106. This simple system 50 with just a single initial separator 52 and a single copper recovery conveyor 70 may be adequate to recover a majority of the copper, though as will be explained below, a cascading series of such simple systems 50 may be utilized for great recovery.

Figure 5A:
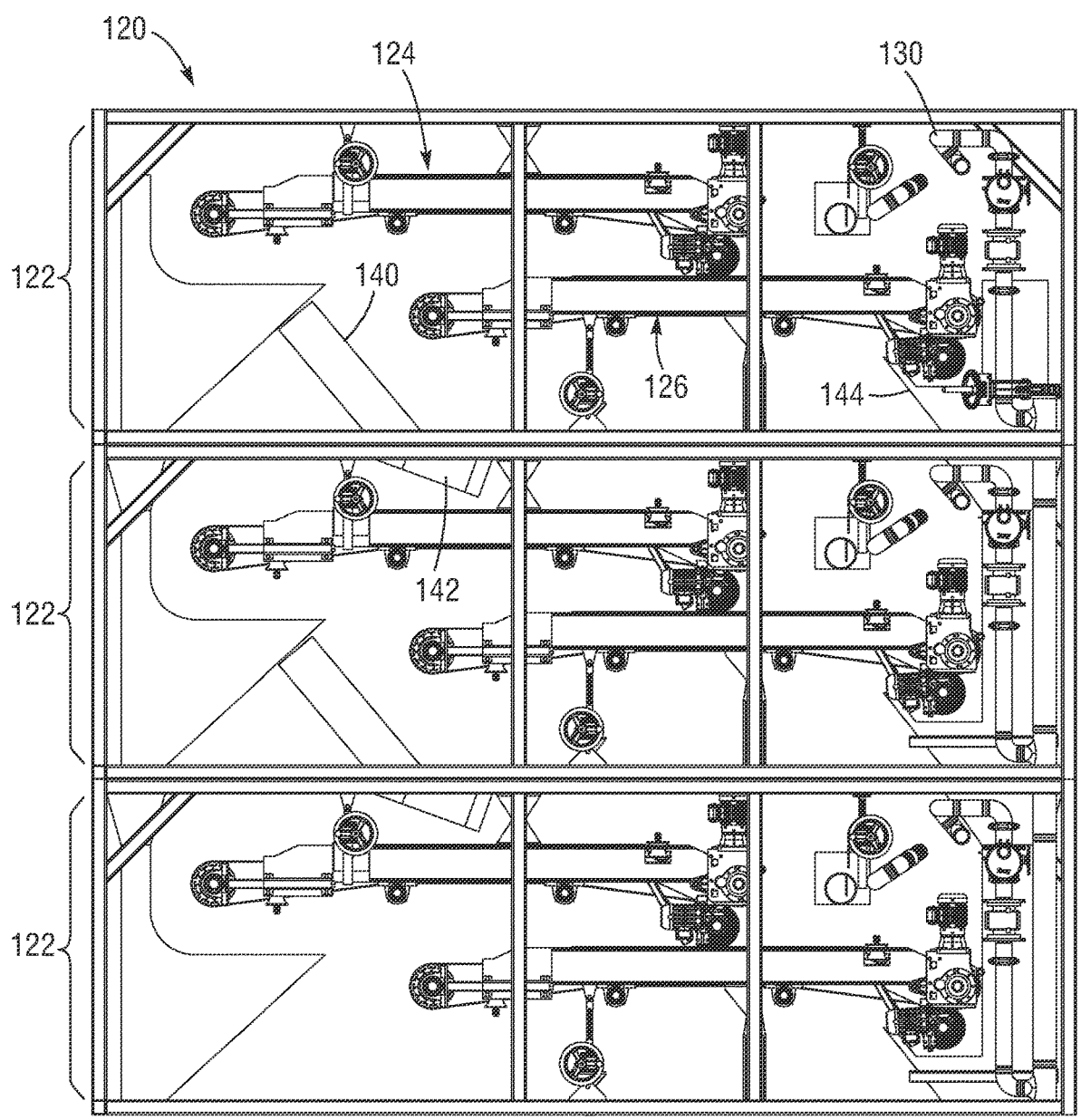
FIGS. 5A-5C are elevational and perspective views of another multi-stage system for recovery of copper from shredded waste including a series of simple systems or modular units, such as illustrated in FIG. 2A, stacked on top of one another.
Figure 5B:
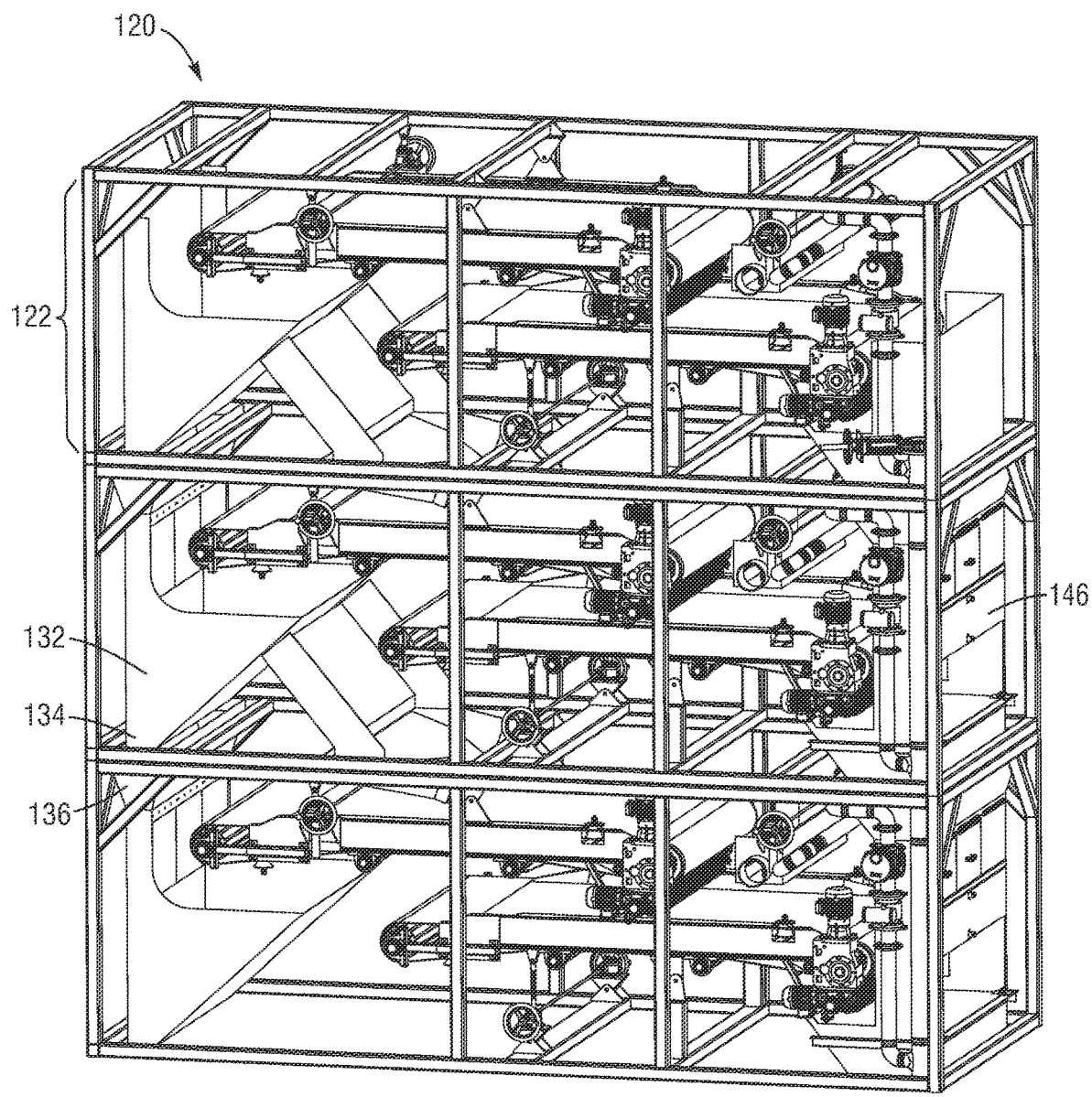
Figure 5C:
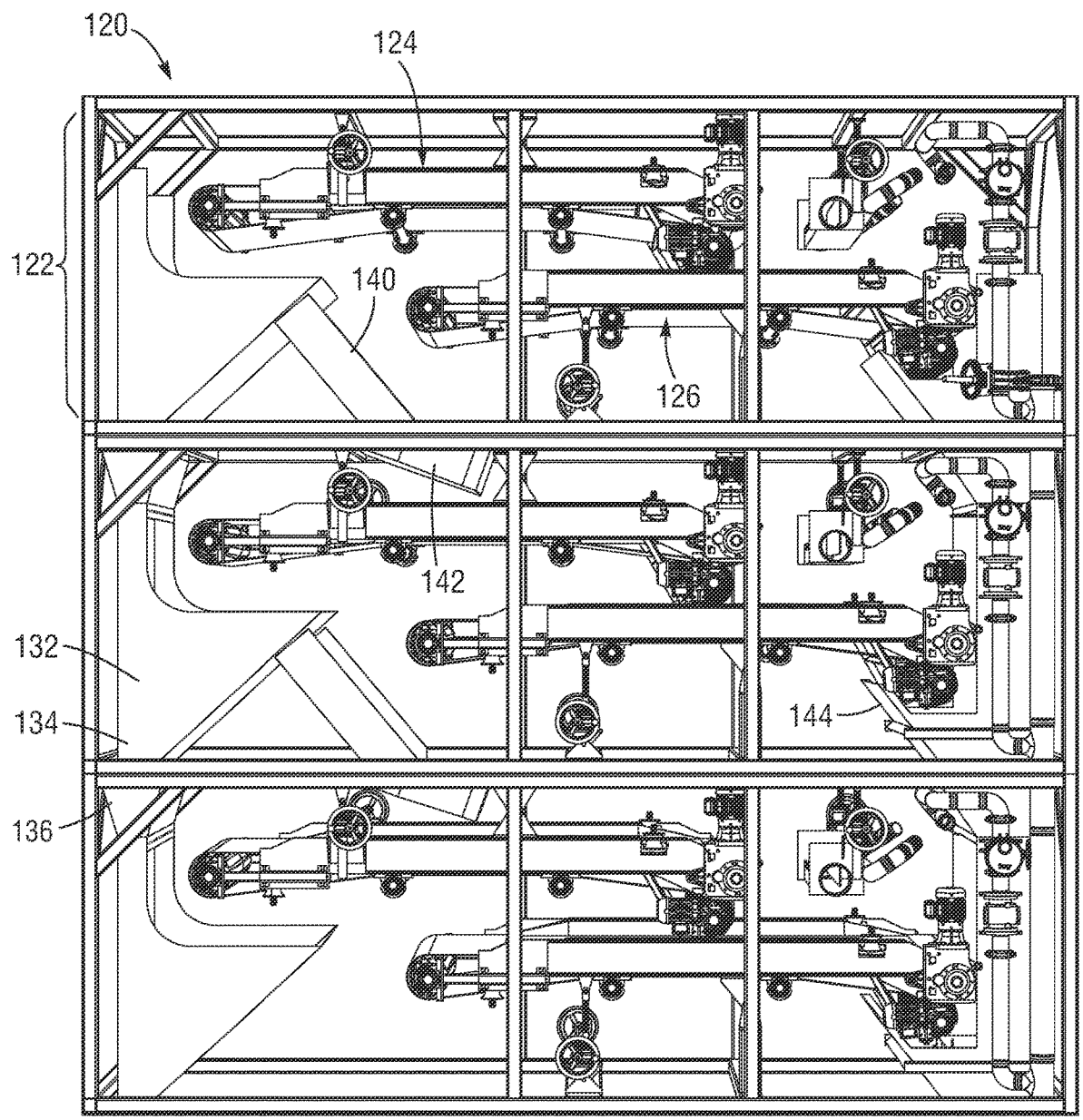

FIGS. 5A-5C are elevational and perspective views of another multi-stage system 120 for recovery of copper from shredded waste including a series of simple systems or modular units 122 such as illustrated at 50 in FIG. 2A stacked on top of one another. The various components of the modular units 122 remain the same as described above, and thus will not be further detailed.

The framework of each of the modular units 122 desirably stacks easily on top of one another and can thus be secured together with common bolts, welds and the like. It should be understood that one or more of the systems 120 with multiple modular units 122 as shown may be preassembled and packed in a shipping container for delivery to the end user. Further, as will be appreciated, customized systems 120 with a variable number of the modular units 122 may be assembled and delivered as needed.

Each of the modular units 122 includes a macro separator 124, such as a conveyor belt described above, and a copper recovery conveyor 126 arranged below it. The macro separator 124 and copper recovery conveyor 126 are both mounted within the framework so as to enable adjustments to the incline angle. A series of water piping 130 is provided for each modular unit 122 to supply water to the water jets, as described above. Preferably, the water piping 130 for each unit 122 connects in series with the piping of the adjacent unit so that only a single source of water for the entire system 120 is needed.

Further, each modular unit includes a plurality of chutes for catching the gradually refined waste products. As seen in FIG. 5B and FIG. 5C, under the lower end of each macro separator 124, a waste chute 132 is positioned having a relatively large mouth which tapers down to an outflow end 134. The outflow end 134 of each modular unit 122 is directed to empty into an inlet funnel-like chute 136 leading to the waste chute 132 of the next modular unit down, and so on. Although not shown, a bin underneath the entire system 50 may be provided to catch all of the lighter material from each stage of the operation. As was explained previously, the upper end of each macro separator 124 is positioned over a midpoint of the copper recovery conveyor 126 immediately below it, and therefore no chutes are needed in this regard.

In a similar manner, as seen in FIG. 5A and FIG. 5B, each copper recovery conveyor 126 has a waste chute 140 underneath its lower end which conveys lighter material which washes off the conveyor downward to the midpoint of a macro separator 124 in the next adjacent modular unit 122. An auxiliary chute 142 may be provided above the macro separator 124 to further guide this waste stream. Underneath the upper end of each copper recovery conveyor 126 is a recovery chute 144 that guides the valuable copper recovered downward. Each successive modular unit 122 has a vertical recovery duct 146 which receives the copper from above, to be combined with any new copper recovered, and channels it further downward. Again, a final copper recovery bin (not shown) may be provided underneath the lowest modular unit 122.

Figure 6:
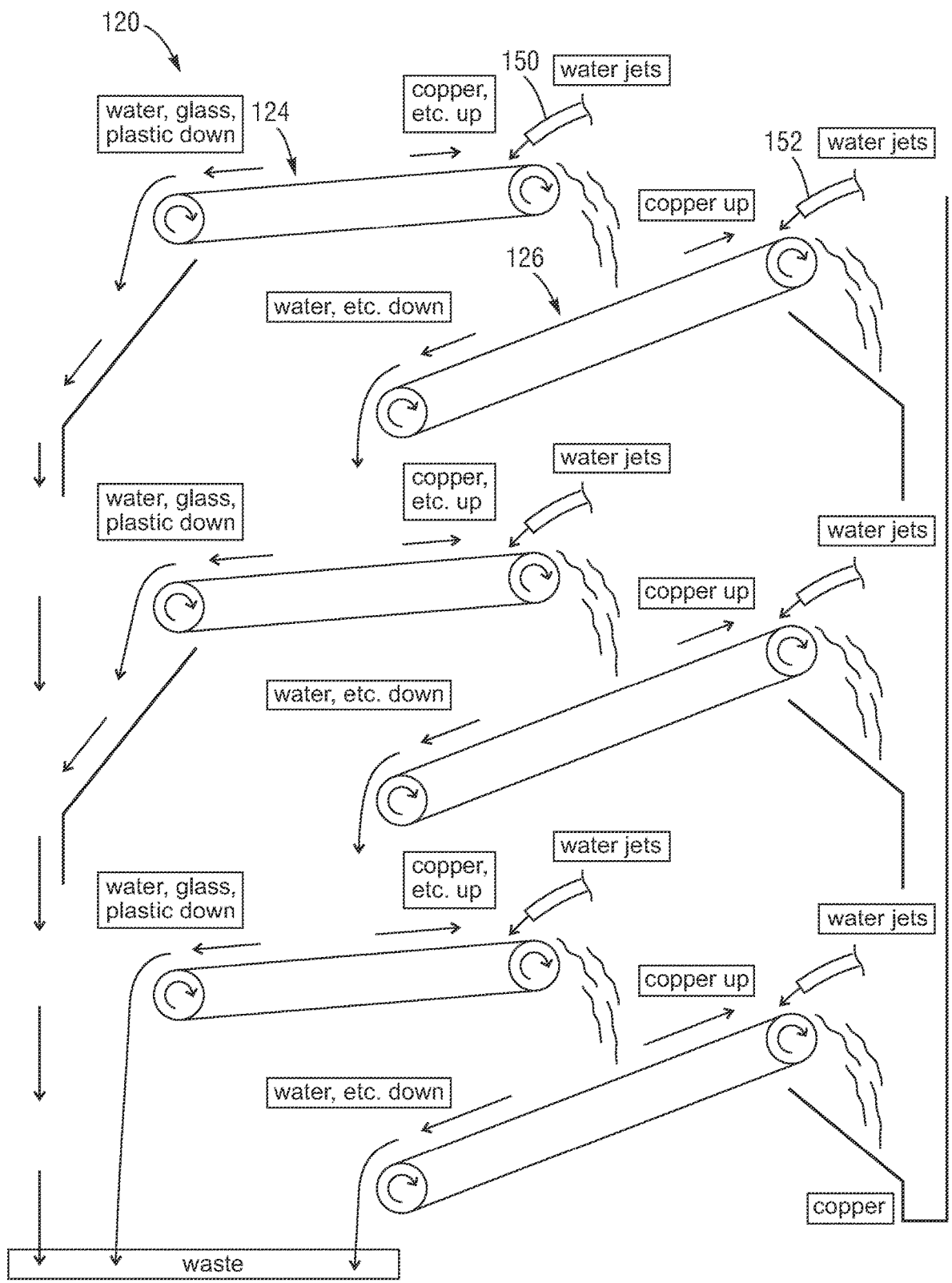
FIG. 6 is a schematic flow diagram of the multi-stage stacked system in use.

FIG. 6 is a schematic flow diagram of the multi-stage stacked system 120 in use. The various components described above are numbered, with the addition of a series of water jets 150, 152 for each modular unit 122.

An overhead chute or conveyor deposits shredded waste or ASR onto the midpoint of the upper macro separator 124. The water jets 150 wash the lighter material downward along the inclined belt of the macro separator 124 so as to fall into the adjacent waste chute 132. Each successive macro separator 124 deposits its lighter waste into the waste chute 132 in that particular module 122, until the combined lightweight waste falls into a collection bin shown at the bottom left in FIG. 6.

The heavier material including copper that is carried over the upper end of the macro separator 124 falls directly onto a midpoint of the first copper recovery conveyor 126. As mentioned, the belt of the conveyor 126 is inclined at a particular angle between 0-15° and water from the jets 152 washes downward along its surface. From there, any lighter material falls downward to be guided to a midpoint of the macro separator 124 in the next modular unit 122 below. This is aided by the waste chute 140 and auxiliary chute 142, such as seen in FIG. 5C. Heavier material including copper strands and bits of wire are not affected by the water as much and are carried upward on the belt of the conveyor 126. That heavier material then falls into the waiting recovery chute 144 to be combined with the recovered copper another heavier material from the other units 122. Eventually, the combined heavier material is deposited into a recovery bin shown at the bottom right in FIG. 6.

Tests of the systems such as shown at 120 prove that up to 80-90% of the copper wire in the shredded flow can be recovered, representing a four-fold increase from previous methods of up to 20%. A series of three modular units 122 is believed to be desirable to reach this yield, though more or less may be used as needed.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A separator system for separating copper from shredded waste, comprising:
    a macro separator configured to perform an initial segregation of lighter material from heavier material in a stream of shredded waste;
    at least two copper recovery conveyors disposed below the macro separator, each copper recovery conveyor including a recovery conveyor belt inclined at an upward angle of between 0-15°, the recovery conveyor belt being formed of an elastomeric material having a series of distributed cleats thereon that carry heavier material including copper over an upper end of the recovery conveyor belt, and at least one water jet being aimed at an upper end of the recovery conveyor belt to cause a downward flow of water over the top of the recovery conveyor belt so as to wash lighter material over a lower end of the recovery conveyor belt, wherein there is one macro separator associated with and placed above each copper recovery conveyor in the system and positioned to drop heavier material onto a mid-point of the associated copper recovery conveyor, and each copper recovery conveyor is positioned over a next lower macro separator to drop lighter material onto a mid-point of the next lower macro separator.

2. The system of claim 1, wherein the cleats comprise wedge-shaped elements that extend upward from a planar base of the recovery conveyor belt, the wedge-shaped elements having a tall leading end tapering downward to a trailing end at the level of the planar base.

3. The system of claim 2, wherein the cleats are arranged in linear rows extending laterally across the recovery conveyor belt, and wherein cleats in any one row are laterally offset from cleats in adjacent rows.

4. The system of claim 3, wherein the elastomeric material of the conveyor belt is 2-ply PVC with a durometer of 50 as measured on the A-scale.

5. The system of claim 1, wherein the elastomeric material of the conveyor belt is 2-ply PVC with a durometer of 50 as measured on the A-scale.

6. The system of claim 1, wherein each copper recovery conveyor is adjustably mounted such that the upward angle is adjustable.

7. The system of claim 1, wherein each pair of one macro separator and one copper recovery conveyor is mounted in a framework to form a modular unit, and wherein a plurality of modular units are stacked on top of each other.

8. The system of claim 7, wherein the stacked plurality of modular units has a series of connected waste chutes for transporting away lighter material from each of the macro separators to a common waste receptacle, and a series of connected recovery chutes for transporting away heavier material from each of the copper recovery conveyors to a common recovery receptacle.

9. The system of claim 7, wherein the stacked plurality of modular units has a network of connected water pipes to supply water to each of the water jets for the respective copper recovery conveyors, and one common water inlet.

10. A separator system for separating copper from shredded waste, comprising:
   a macro separator configured to perform an initial segregation of lighter material from heavier material in a stream of shredded waste, the macro separator comprising a rotating conveyor belt inclined at an upward angle and having at least one water jet being aimed at an upper end of the conveyor belt to cause a downward flow of water over the top of the conveyor belt;
   a copper recovery conveyor associated with and disposed below the macro separator and positioned to receive material dropped from an upper end of the macro separator, the copper recovery conveyor including a recovery conveyor belt inclined at an upward angle, the recovery conveyor belt being formed of an elastomeric material having a series of distributed wedge-shaped cleats thereon, the wedge-shaped elements having a tall leading end tapering downward to a trailing end at the level of the planar base, and at least one water jet being aimed at an upper end of the conveyor belt to cause a downward flow of water over the top of the recovery conveyor belt, wherein there are a plurality of macro separators each associated with and placed above a different associated copper recovery conveyor and positioned to drop heavier material onto a mid-point of the associated copper recovery conveyor, and each copper recovery conveyor is positioned over a next lower macro separator to drop lighter material onto a mid-point of the next lower macro separator.

11. The system of claim 10, wherein the cleats are arranged in linear rows extending laterally across the recovery conveyor belt, and wherein cleats in any one row are laterally offset from cleats in adjacent rows.

12. The system of claim 11, wherein the elastomeric material of the recovery conveyor belt is 2-ply PVC with a durometer of 50 as measured on the A-scale.

13. The system of claim 10, wherein the elastomeric material of the recovery conveyor belt is 2-ply PVC with a durometer of 50 as measured on the A-scale.

14. The system of claim 10, wherein the copper recovery conveyor is adjustably mounted such that the upward angle is adjustable.

15. The system of claim 14, wherein the recovery conveyor is inclined between 0-15°, and the macro separator conveyor belt is inclined between 0-4°.

16. The system of claim 10, wherein each pair of one macro separator and one copper recovery conveyor is mounted in a framework to form a modular unit, and wherein a plurality of modular units are stacked on top of each other.

17. The system of claim 16, wherein the stacked plurality of modular units has a series of connected waste chutes for transporting away lighter material from each of the macro separators to a common waste receptacle, and a series of connected recovery chutes for transporting away heavier material from each of the copper recovery conveyors to a common recovery receptacle.

18. The system of claim 16, wherein the stacked plurality of modular units has a network of connected water pipes to supply water to each of the water jets for the respective copper recovery conveyors, and one common water inlet.

* * * * *